(12) United States Patent
Kimura

(10) Patent No.: US 6,838,499 B2
(45) Date of Patent: Jan. 4, 2005

(54) CURABLE COMPOSITIONS

(75) Inventor: Tsuneo Kimura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 128 days.

(21) Appl. No.: 10/367,799

(22) Filed: Feb. 19, 2003

(65) Prior Publication Data

US 2003/0166739 A1 Sep. 4, 2003

(30) Foreign Application Priority Data

Feb. 19, 2002 (JP) ........................................ 2002-040988

(51) Int. Cl.$^7$ ............................................ C08K 5/5419
(52) U.S. Cl. ........................... 524/268; 528/31; 528/32; 528/34; 524/588; 524/858; 524/860; 524/861; 524/862; 524/863; 525/477
(58) Field of Search ................................. 524/268, 588, 524/858, 860, 861, 862, 863; 525/477; 528/31, 32, 34

(56) References Cited

U.S. PATENT DOCUMENTS

| | | | | |
|---|---|---|---|---|
| 4,985,277 A | * | 1/1991 | Shimizu et al. | 427/180 |
| 5,066,714 A | * | 11/1991 | Inoue et al. | 524/731 |
| 5,693,689 A | * | 12/1997 | Gibbon | 523/137 |

FOREIGN PATENT DOCUMENTS

| | | | | |
|---|---|---|---|---|
| JP | 62025180 A | * | 2/1987 | C09D/5/00 |
| JP | 63-10662 A | | 1/1988 | |
| JP | 01165652 A | * | 6/1989 | C08L/63/00 |
| JP | 10-511730 A | | 11/1998 | |
| JP | 11-61100 A | | 3/1999 | |
| JP | 11-106738 A | | 4/1999 | |
| WO | WO 96/20980 A1 | | 7/1996 | |

\* cited by examiner

Primary Examiner—Margaret G. Moore
Assistant Examiner—Marc S. Zimmer
(74) Attorney, Agent, or Firm—Birch, Stewart, Kolasch & Birch, LLP

(57) ABSTRACT

A curable composition comprising a liquid base polymer, a silicone elastomer powder, and a crosslinking agent is in putty form prior to curing, tack-free to the hand, easy to work, and adherent.

8 Claims, No Drawings

CURABLE COMPOSITIONS

TECHNICAL FIELD

This invention relates to curable compositions in putty form, and more particularly, to puttylike curable compositions which are tack-free during manual operation and remain stable with the passage of time.

BACKGROUND OF THE INVENTION

In the prior art, room temperature-curable organopolysiloxane compositions are widely used as sealing agents or the like. Prior to curing, they are liquid or pasty and thus tacky to the worker hands so that manual operation is substantially prohibited.

Adhesives and sealing agents in putty form are also known in the art. Among others, silicone putties using organopolysiloxanes as base polymers are well known. As compared with other organic rubbers, silicone putties have good heat resistance and freeze resistance and maintain stable rubber physical properties and electrical properties even at elevated temperatures or in a hot humid environment, and thus used in a variety of applications including electric, electronic, automotive and building industries. In particular, silicone putties endowed with a curing ability are used as shape-forming, dental impression and building sealing materials and find many other applications.

These puttylike curable silicone compositions are generally formulated by compounding a polyorganosiloxane as a base polymer with a filler for imparting a putty form prior to curing such as fumed silica, finely divided quartz, calcium carbonate, diatomaceous earth and aluminum silicate, and optionally adding a curing or curing agent for imparting curing ability. In order that these compositions be endowed with a putty form, made tack-free to the hands or fingers and effectively worked, the viscosity of the base polymer and the type and quantity of the filler must be carefully selected. Otherwise, the properties of the cured product are substantially limited.

JP-A 63-10662 discloses a puttylike silicone composition comprising a polyorganosiloxane and a polymethylsilsesquioxane. However, the polymethylsilsesquioxane is a non-elastic resin and has a durometer hardness of at least 90 as measured by the JIS Type A durometer hardness test. When the polymethylsilsesquioxane is compounded in a curable silicone composition, the rubber as cured lacks flexibility due to an increased hardness and has poor adhesion and sealing tightness. JP-A 10-511730 discloses a sealing composition comprising a high viscosity oil as a base polymer, which composition is self-supporting prior to curing. JP-A 11-61100 and JP-A 11-106738 disclose sealing compositions comprising a high molecular weight gum-like base polymer and fumed silica. All these compositions are unsatisfactory in ease of working and rubber elasticity.

SUMMARY OF THE INVENTION

An object of the invention is to provide a curable composition which is fully adherent and in putty form prior to curing and cures into a product exhibiting high flexibility.

We have found that when a silicone elastomer powder is included in a curable composition comprising a liquid base polymer and a crosslinking agent, the composition becomes puttylike and tack-free to the worker hands so that it can be effectively worked. Since the silicone elastomer powder is an elastomer having a durometer hardness of 10 to 80 as measured by the JIS Type A durometer hardness test, the inclusion of the powder, even in a large amount, does not detract from rubber elasticity. The composition remains fully adherent, and the composition as cured is satisfactorily flexible.

Therefore, the present invention provides a curable composition comprising a liquid base polymer, a silicone elastomer powder, and a crosslinking agent, the composition being in putty form prior to curing.

The inventive compositions are puttylike in the uncured state, but acquire high pressure resistance immediately after application, and develop adherence after curing. Therefore, the inventive compositions are highly compliant with those applications where liquid and pasty curable compositions have been traditionally used, such as, for example, gasket materials including automobile oil seal materials (FIPG materials), adhesive seals between electric conductors and resin covers, adhesive seals between resin casings or connectors and electric conductors, and adhesive seals for vacuum or pressurized chambers. Also, the inventive compositions are highly compliant with the uses where adhesive seal materials to be applied in-situ or in factory must cease flowing immediately after application, such as, for example, adhesive seals between rubber gaskets and glass surface, multilayer glass joint seals, adhesive seals at water-proof sheet joints and end faces, adhesive seals between solar collectors and rooftop waterproof sheets, adhesive seals between solar photovoltaic panels and roofing, surface bonds of siding panels to building wall members, adhesive seals between glass or transparent resin plates and window frames in microwave ovens, meters or other instruments. In addition to the foregoing applications, the inventive compositions can be advantageously used as repairing materials for toys, figurative models, structures, shaped articles and electric or electronic parts, and as clay of the curing type, because they are curable at room temperature and eliminate a need for heating ovens.

DETAILED DESCRIPTION OF THE INVENTION

The curable compositions of the present invention are defined as comprising a liquid base polymer, a silicone elastomer powder, and a crosslinking agent and are suitable especially as various adhesive seal materials.

The inventive curable compositions include, but are not limited to, silicone, modified silicone, acrylic, polysulfide, polyurethane and polyisobutylene base compositions. Of these, silicone rubber compositions are preferred.

The silicone rubber compositions in one preferred embodiment of the present invention are those compositions comprising a diorganopolysiloxane as a base polymer. Their curing type is preferably condensation curing, addition curing or radiation curing type, but is not limited thereto. Condensation curing type compositions are most preferred.

The diorganopolysiloxane used herein as the base polymer preferably has the average compositional formula:

$$R_aSiO_{(4-a)/2}$$

wherein R is independently selected from among substituted or unsubstituted monovalent hydrocarbon groups, preferably having 1 to 12 carbon atoms, more preferably 1 to 10 carbon atoms, and "a" is a number of 1.90 to 2.05. Suitable monovalent hydrocarbon groups represented by R include alkyl groups such as methyl, ethyl, propyl, butyl, 2-ethylbutyl and octyl, cycloalkyl groups such as cyclohexyl and cyclopentyl, alkenyl groups such as vinyl, hexenyl and allyl, aryl groups such as phenyl, tolyl, xylyl, naphthyl and diphenyl, aralkyl groups such as benzyl and phenylethyl, and substituted groups of the foregoing in which some or all of the hydrogen atoms attached to carbon atoms are substituted with halogen atoms or cyano groups, for example, chloromethyl, trifluoropropyl, 2-cyanoethyl and 3-cyanopropyl, and such groups which contain or have substituted thereon an amino, ether (—O—), carbonyl (—CO—), carboxyl (—COOH) or sulfonyl (—SO$_2$—) group.

In the first preferred embodiment wherein the silicone rubber composition is of the condensation curing type, the base polymer is preferably a diorganopolysiloxane of the following general formula (1) or (2) whose molecular chain is end-capped with a hydrolyzable group such as a hydroxyl or organoxy group.

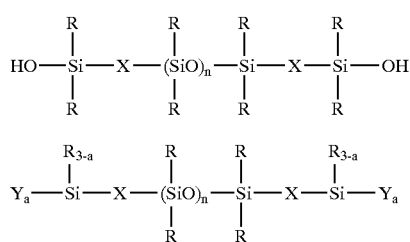

Herein R is a substituted or unsubstituted monovalent hydrocarbon group, X is an oxygen atom or a divalent hydrocarbon group having 1 to 8 carbon atoms, Y is a hydrolyzable group, n is such a number that the diorganopolysiloxane has a viscosity of at least 25 centistokes (cs) at 25° C., more preferably 100 to 1,000,000 cs at 25° C., and "a" is 2 or 3.

The substituted or unsubstituted monovalent hydrocarbon groups represented by R are as exemplified above for the foregoing R. Among others, methyl, phenyl and vinyl are preferred, with methyl being most preferred. The divalent hydrocarbon groups represented by X are those having 1 to 8 carbon atoms, preferably 2 to 6 carbon atoms, for example, alkylene groups such as methylene, ethylene and propylene, cycloalkylene groups such as cyclohexylene, arylene groups such as phenylene, and substituted groups of the foregoing in which some or all of the hydrogen atoms are substituted with halogen atoms. Preferably, X is an oxygen atom or ethylene group. The hydrolyzable groups represented by Y include alkoxy groups such as methoxy, ethoxy and butoxy, ketoxime groups such as dimethylketoxime and methylethylketoxime, acyloxy groups such as acetoxy, alkenyloxy groups such as isopropenyloxy and isobutenyloxy, amino groups such as N-butylamino and N,N-diethylamino, amide groups such as N-methylacetamide, and chlorine atoms. Of these, alkoxy groups are preferred.

In order that the composition afford a cured product having satisfactory rubber physical properties and mechanical strength, the diorganopolysiloxane used herein should preferably have a viscosity of at least 25 cs at 25° C., more preferably 100 to 1,000,000 cs at 25° C.

As a crosslinking agent for the diorganopolysiloxane, a silane or siloxane compound having at least two hydrolyzable groups in a molecule is used. Examples of suitable hydrolyzable groups include alkoxy groups such as methoxy, ethoxy and butoxy, ketoxime groups such as dimethylketoxime and methylethylketoxime, acyloxy groups such as acetoxy, alkenyloxy groups such as isopropenyloxy and isobutenyloxy, amino groups such as N-butylamino and N,N-diethylamino, and amide groups such as N-methylacetamide, with the alkoxy, ketoxime, alkenyloxy and acyloxy groups being preferred. The crosslinking agent is blended in amounts of 1 to 50 parts by weight, more preferably 2 to 20 parts by weight per 100 parts by weight of the hydroxyl or organoxy end-capped organopolysiloxane.

Curing catalysts are often used in the condensation curing type silicone rubber compositions. Illustrative of the curing catalysts are alkyl tin esters such as dibutyltin diacetate, dibutyltin dilaurate and dibutyltin dioctoate; titanates and titanium chelate compounds such as tetraisopropoxytitanium, tetra-n-butoxytitanium, tetrakis(2-ethylhexoxy)titanium, dipropoxybis(acetylacetonato)titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxy aluminum compounds; aminoalkyl-substituted alkoxysilanes such as 3-aminopropyltriethoxysilane and N-β-(aminoethyl)-γ-aminopropyltrimethoxysilane; amines and salts thereof such as hexylamine and dodecylamine phosphate; quaternary ammonium salts such as benzyltriethylammonium acetate; alkali metal salts of lower fatty acids such as potassium acetate, sodium acetate and sodium oxalate; dialkylhydroxylamines such as dimethylhydroxylamine and diethylhydroxylamine; and guanidyl-containing silanes or siloxanes such as tetramethylguanidylpropyltrimethoxysilane, tetramethylguanidylpropylmethyldimethoxysilane, and tetramethylguanidylpropyltris(trimethylsiloxy)silane. These catalysts may be used alone or in admixture of two or more. The curing catalyst is used in amounts of 0 to 10 parts by weight, preferably 0.01 to 5 parts by weight per 100 parts by weight of the diorganopolysiloxane.

In the second preferred embodiment wherein the inventive silicone rubber composition is of the addition curing type, the diorganopolysiloxane used as the base polymer should have at least two alkenyl groups at ends of the molecular chain and/or within the molecular chain. This diorganopolysiloxane should preferably have a viscosity of at least 25 cs at 25° C., more preferably 100 to 10,000,000 cs at 25° C.

As a crosslinking agent for the diorganopolysiloxane, an organohydrogenpolysiloxane having at least two, preferably at least three SiH groups in a molecule is used. The organohydrogenpolysiloxane used herein may be selected from well-known ones and preferably from those having a viscosity of up to 300 cs at 25° C. The organohydrogenpolysiloxane is preferably used in such amounts as to give 0.3 to 10 mol, more preferably 0.5 to 5 mol of SiH groups per mol of alkenyl groups in the organopolysiloxane as the base polymer.

To the composition of the second preferred embodiment, a curing catalyst is preferably added in a catalytic amount. It may be selected from well-know addition reaction catalysts, for example, Group VIII metals and compounds thereof, especially platinum compounds. Illustrative of the platinum compounds are chloroplatinic acid and platinum-olefin complexes. The addition reaction catalyst is preferably added in amounts of 0.1 to 2,000 ppm, more preferably 1 to 1,000 ppm based on the diorganopolysiloxane as the base polymer.

In the third preferred embodiment wherein the inventive silicone rubber composition is of the radiation curing type, the diorganopolysiloxane used as the base polymer should have aliphatic unsaturated groups (e.g., vinyl, allyl, alkenyloxy, acrylic or methacrylic groups), mercapto groups, epoxy groups, hydrosilyl groups or other groups at ends of the molecular chain and/or within the molecular chain. This diorganopolysiloxane should preferably have a viscosity of at least 25 cs at 25° C., more preferably 100 to 10,000,000 cs at 25° C.

The composition further contains a reaction initiator or crosslinking agent. As is well known in the art, the initiators include acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthol, 3,9-dichloroxanthol, 3-chloro-8-nonylxanthol, benzoin, benzoin methyl ether, benzoin butyl ether, bis(4-dimethylaminophenyl)ketone, benzyl methoxy ketal, and 2-chlorothioxanthol. The initiator is preferably blended in amounts of 0.1 to 20 parts by weight, more preferably 0.5 to 10 parts by weight per 100 parts by weight of the organopolysiloxane.

In the curable composition of the invention is included a silicone elastomer powder. The use of the silicone elastomer powder makes the curable composition puttylike and tack-free to the worker hands. The composition also becomes stable with the passage of time. In addition, the composition when cured exhibits good elasticity and seal tightness.

The silicone elastomer powder used herein is a finely divided silicone rubber. Though not critical, the silicone elastomer is preferably prepared by reacting an organopolysiloxane having, on the average, at least two olefinic unsaturated groups in a molecule with another organopolysiloxane having, on the average, at least two silicon-bonded hydrogen atoms in a molecule in the presence of an addition reaction catalyst.

In one exemplary process, a mixture of an organopolysiloxane having, on the average, at least two olefinic unsaturated groups in a molecule, another organopolysiloxane having, on the average, at least two silicon-bonded hydrogen atoms in a molecule and an addition reaction catalyst is agitated and mixed while heating at a temperature of 25 to 100° C., whereby the organopolysiloxane is cured. The resulting elastomer is finely divided by means of a high shear grinding machine. Exemplary of the high shear grinding machine are a roll mill, sand grinder, ball mill and the like. This process yields a powder of particles of different shapes.

In another process, a mixture of an organopolysiloxane having, on the average, at least two olefinic unsaturated groups in a molecule and another organopolysiloxane having, on the average, at least two silicon-bonded hydrogen atoms in a molecule is dispersed in water using a nonionic surfactant or ionic surfactant, to which an addition reaction catalyst is added whereupon curing reaction takes place. The resulting elastomer is then separated and dried. This process yields a powder of spherical particles.

In order that the composition be endowed with putty form, tack-free properties to the worker hands, and ease of working prior to curing, and in order that the cured composition be endowed with flexibility and adherence, a silicone elastomer powder of spherical particles is preferred.

The silicone elastomer powder preferably has an average particle size of 0.1 to 1,000 μm, more preferably 1 to 100 μm. With an average particle size of less than 0.1 μm, the powder may become too cohesive. With an average particle size of more than 1,000 μm, the powder may become non-uniform.

The silicone elastomer powder is preferably blended in amounts of 25 to 500 parts by weight, more preferably 50 to 400 parts by weight per 100 parts by weight of the base polymer. With too small an amount of the powder, the composition may become tacky to the hand. With too large an amount of the powder, difficulties may arise in working.

An adhesion promoter may be added to the puttylike curable composition of the invention for improving the adhesion. Suitable adhesion promoters include silane coupling agents such as amino group-containing alkoxysilanes and titanium coupling agents, with the silane coupling agents being preferred. An appropriate amount of the adhesion promoter is 0.1 to 30 parts by weight, more preferably 0.2 to 20 parts by weight per 100 parts by weight of the diorganopolysiloxane as the base polymer.

In addition to the silicone elastomer powder, one or more filler may be added to the puttylike curable composition of the invention for reinforcement or other purposes, if desired. Examples of the filler which is generally used in the silicone rubber composition of this type include reinforcing fillers such as fumed silica, precipitated silica, quartz flour, carbon powder, talc, zeolite and bentonite; fibrous fillers such as asbestos, glass fibers, carbon fibers and organic fibers; and basic fillers such as calcium carbonate, zinc carbonate, magnesium oxide and celite, which may be surface treated with silanes, siloxanes, resin acids or the like. The amount of the filler other than the silicone elastomer powder is preferably 1 to 500 parts by weight, more preferably 5 to 200 parts by weight per 100 parts by weight of the base polymer, though not critical.

Various compounds are optionally added to the silicone rubber composition of the invention as long as they do not compromise the putty form and ease of working of the composition and the flexibility and adhesion of the cured composition. For example, thixotropic agents such as polyethylene glycol and derivatives thereof, heat resistance improvers such as red iron oxide and cerium oxide, freeze resistance improvers, dehydrating agents, anti-rusting agents, liquid reinforcements such as network polysiloxane comprising triorganosiloxy units and $SiO_2$ units and/or monoorganosiloxy units, and the like are added in conventional amounts, if desired.

The puttylike curable composition of the invention can be prepared by mixing predetermined amounts of the above-mentioned components in a planetary mixer, Shinagawa mixer or the like according to a conventional process.

With respect to the curing method and conditions of the puttylike curable composition of the invention, any well-known method and conditions may be employed depending on the type of composition.

In the case of condensation curing type, the composition must be stored in a moisture-free atmosphere because the composition can cure with moisture in the air.

As used herein, the term "putty form" or "puttylike" means that unlike the paste which is tacky to the hand, the composition is clay-like and tack-free to the hand, and can be manually shaped to a rope or any other shape.

From the handling and processing aspect, the curable composition of the invention preferably has a Williams plasticity at 25° C. of 50 to 500, more preferably 70 to 400, and most preferably 80 to 350. The composition with too low a plasticity may be too soft and tacky to the hand whereas the composition with too high a plasticity may be too hard and interfere with manual operation.

Prior to curing, the curable composition of the invention is puttylike, tack-free to the hand and effective to manual operation and yet remains fully adherent. The composition, when cured, exhibits high flexibility.

EXAMPLE

Examples of the invention are given below by way of illustration and not by way of limitation. Note that the viscosity is a measurement at 25° C.

Example 1

100 parts by weight of a dimethylpolysiloxane capped with a hydroxyl group at either end of the molecular chain and having a viscosity of 20,000 mPa·s, 200 parts by weight of a spherical silicone elastomer powder having an average particle size of 12 μm, 6 parts by weight of methyltributanoximesilane, 0.1 part by weight of dibutyltin dioctoate, and 1 part by weight of γ-aminopropyltriethoxysilane were milled under a reduced pressure, obtaining a puttylike sample 1.

Example 2

100 parts by weight of a dimethylpolysiloxane capped with a hydroxyl group at either end of the molecular chain and having a viscosity of 20,000 mPa·s, 200 parts by weight of a spherical silicone elastomer powder having an average particle size of 12 μm, 6 parts by weight of vinyltriisopropenoxysilane, 1 part by weight of tetramethylguanidylpropyltrimethoxysilane, and 1 part by weight of γ-aminopropyltriethoxysilane were milled under a reduced pressure, obtaining a puttylike sample 2.

Example 3

A puttylike sample 3 was prepared as in Example 1 except that a spherical silicone elastomer powder having an average particle size of 4 μm was used instead of the spherical silicone elastomer powder having an average particle size of 12 μm.

Example 4

100 parts by weight of a dimethylpolysiloxane capped with a hydroxyl group at either end of the molecular chain and having a viscosity of 50,000 mPa·s, 20 parts by weight of a dimethylpolysiloxane capped with a trimethylsiloxy group at either end of the molecular chain and having a viscosity of 100 mPa·s, 100 parts by weight of a spherical silicone elastomer powder having an average particle size of 12 μm, 10 parts by weight of fumed silica surface treated with dimethyldichlorosilane and having a specific surface area of 110 m²/g, 6 parts by weight of vinyltributanoximesilane, 0.1 part by weight of dioctyltin dilaurate, and 1 part by weight of γ-aminopropyltriethoxysilane were milled under a reduced pressure, obtaining a puttylike sample 4.

Example 5

100 parts by weight of a dimethylpolysiloxane capped with a hydroxyl group at either end of the molecular chain and having a viscosity of 50,000 mPa·s, 20 parts by weight of a dimethylpolysiloxane capped with a trimethylsiloxy group at either end of the molecular chain and having a viscosity of 100 mPa·s, 75 parts by weight of a spherical silicone elastomer powder having an average particle size of 4 μm, 15 parts by weight of fumed silica surface treated with dimethyldichlorosilane and having a specific surface area of 110 m²/g, 6 parts by weight of vinyltributanoximesilane, 0.1 part by weight of dioctyltin dilaurate, and 1 part by weight of γ-aminopropyltriethoxysilane were milled under a reduced pressure, obtaining a puttylike sample 5.

Example 6

100 parts by weight of a dimethylpolysiloxane capped with a trimethoxysilyl group at either end of the molecular chain and having a viscosity of 20,000 mPa·s, 100 parts by weight of a spherical silicone elastomer powder having an average particle size of 12 μm, 20 parts by weight of fumed silica surface treated with hexamethyldisilazane and having a specific surface area of 200 m²/g, 8 parts by weight of vinyltrimethoxysilane, 2 parts by weight of dipropoxybis(acetylacetonato)titanium, and 1 part by weight of γ-glycidoxypropyltrimethoxysilane were milled under a reduced pressure, obtaining a puttylike sample 6.

Example 7

100 parts by weight of a polypropylene oxide capped with a methyldimethoxysilylpropyl group at either end of the molecular chain and having a viscosity of 4,000 mPa·s, 300 parts by weight of a spherical silicone elastomer powder having an average particle size of 12 μm, 2 parts by weight of dibutyltin dimethoxide, and 1 part by weight of γ-ethylenediaminopropyltrimethoxysilane were milled under a reduced pressure, obtaining a puttylike sample 7.

Comparative Examples 1–7

Compositions were prepared as in Examples 1 to 7 without adding the silicone elastomer powder. They are designated samples 1' to 7'.

The form of the compositions of Examples and Comparative Examples was inspected by visual observation. A 50-g portion taken out of the composition was kneaded with hands to examine the workability (ease of kneading or tackiness). The composition was rated OK when easy to knead and NG when difficult or impossible to knead. The results are shown in Tables 1 and 2.

For each of Examples 1 to 7, the puttylike composition was shaped into a sheet of 2 mm thick and cured for 7 days in an atmosphere of 23±2° C. and RH 50±5%. The physical properties (hardness, elongation and tensile strength) of the rubber sheet were measured according to JIS K-6249. Separately, aluminum plates of 25 mm×100 mm×0.3 mm (thick) were bonded with the composition to assemble a shear adhesion test piece having an bond thickness of 2 mm and a bond area of 2.5 cm² and the composition cured under the same conditions as above. Using this test piece, the longitudinal shear strength and percent cohesive failure were measured. Further, for each of Examples 1 to 7, a 200-g portion of the puttylike composition was wrapped with polyethylene film and placed in an aluminum laminate package whose opening was heat sealed. The wrapped composition in the package was kept at 70° C. for 7 days. The thus aged composition was examined for form, workability and plasticity. The results are also shown in Table 1.

TABLE 1

|  |  | Example | | | | | | |
|---|---|---|---|---|---|---|---|---|
|  |  | 1 | 2 | 3 | 4 | 5 | 6 | 7 |
| Initial | Form | putty | putty | putty | putty | putty | putty | putty |
|  | Workability | OK | OK | OK | OK | OK | OK | OK |
|  | Plasticity | 81 | 85 | 89 | 175 | 312 | 300 | 90 |
|  | Hardness (Durometer A) | 24 | 26 | 20 | 25 | 32 | 40 | 27 |
|  | Elongation (%) | 220 | 210 | 300 | 250 | 220 | 350 | 150 |
|  | Tensile strength (MPa) | 0.8 | 0.9 | 1.1 | 1.0 | 1.5 | 2.9 | 0.7 |
|  | Al plate shear strength (MPa) | 0.4 | 0.4 | 0.5 | 0.6 | 0.9 | 1.2 | 0.3 |
|  | Cohesive failure (%) | 100 | 100 | 100 | 100 | 100 | 100 | 100 |
| 7 days aged | Appearance | putty | putty | putty | putty | putty | putty | putty |
|  | Workability | OK | OK | OK | OK | OK | OK | OK |
|  | Plasticity | 80 | 88 | 87 | 172 | 310 | 290 | 88 |

TABLE 2

|  | Comparative Example | | | | | | |
|---|---|---|---|---|---|---|---|
|  | 1 | 2 | 3 | 4 | 5 | 6 | 7 |
| Form | liquid | liquid | liquid | paste | paste | paste | liquid |
| Workability | NG | NG | NG | NG | NG | NG | NG |

TABLE 3

|  | Example | | Comparative Example | |
|---|---|---|---|---|
|  | 8 | 9 | 8 | 9 |
| Form | putty | putty | liquid | liquid |
| Workability | OK | OK | NG | NG |

Example 8

100 parts by weight of a dimethylpolysiloxane capped with a vinyl group at either end of the molecular chain and having a viscosity of 3,000 mPa·s, 3.0 parts by weight of a SiH-containing dimethylpolysiloxane having a viscosity of 20 mPa·s, 300 parts by weight of a spherical silicone elastomer powder having an average particle size of 12 μm, and an amount of an isopropanol solution of chloroplatinic acid to give 50 ppm of platinum based on the entire siloxanes were milled, obtaining a puttylike sample 8.

Example 9

100 parts by weight of a dimethylpolysiloxane capped with a bis(acryloxymethyldimethylsiloxy)methylsilyl group at either end of the molecular chain and having a viscosity of 3,000 mPa·s, 3 parts by weight of diethoxyacetophenone, and 300 parts by weight of a spherical silicone elastomer powder having an average particle size of 12 μm were milled, obtaining a puttylike sample 9.

Comparative Examples 8–9

Compositions were prepared as in Examples 8 and 9 without adding the silicone elastomer powder. They are designated samples 8' to 9'.

The form of the compositions of Examples and Comparative Examples was inspected by visual observation. A 50-g portion taken out of the composition was kneaded with hands to examine the workability (ease of kneading or tackiness). The composition was rated OK when easy to knead and NG when difficult or impossible to knead. The results are shown in Table 3.

Japanese Patent Application No. 2002-040988 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable composition comprising a liquid base polymer, a silicone elastomer powder, and a crosslinking agent, the composition being in putty form prior to curing.

2. The curable composition of claim 1 which is a curable silicone rubber composition.

3. The curable composition of claim 2 wherein the curable silicone rubber composition is of the condensation curing, addition curing or radiation curing type.

4. The curable composition of claim 2 wherein the curable silicone rubber composition is of the condensation curing type and wherein the liquid base polymer is a diorganopolysiloxane having the following general formula (1) or (2):

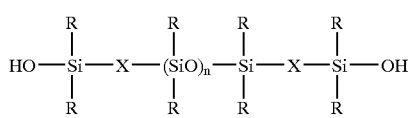

(1)

wherein R is a substituted or unsubstituted monovalent hydrocarbon group, X is an oxygen atom or a divalent hydrocarbon group having 1 to 8 carbon atoms, and n is such a number that the diorganopolysiloxane has a viscosity of at least 25 cs at 25° C.,

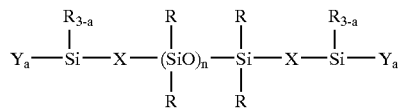

(2)

wherein Y is a hydrolyzable group, a is 2 or 3, and R, X, and n are as defined above.

5. The curable composition of claim 2 wherein the curable silicone rubber composition is of the addition curing type and wherein the liquid base polymer is a diorganopolysiloxane having at least two alkenyl groups in a molecule.

6. The curable composition of claim 1, further comprising a silane coupling agent.

7. The curable composition of claim 1 having a plasticity of 50 to 500 prior to curing.

8. The curable composition of claim 1 which is used as an adhesive seal material.

* * * * *